United States Patent [19]

Stolowicki

[11] Patent Number: 5,548,166

[45] Date of Patent: Aug. 20, 1996

[54] MOMENTARY POWER OUTAGE CARRYOVER DEVICE

[75] Inventor: Ralph Stolowicki, Port Jefferson, N.Y.

[73] Assignee: Long Island Lighting Company, Hicksville, N.Y.

[21] Appl. No.: 164,465

[22] Filed: Dec. 9, 1993

[51] Int. Cl.⁶ .................................................. H02J 15/00
[52] U.S. Cl. ............................ 307/50; 323/340; 323/343; 323/234; 323/258
[58] Field of Search .............................. 307/50; 323/340, 323/343, 234, 258

[56] References Cited

U.S. PATENT DOCUMENTS

| | | | |
|---|---|---|---|
| 3,506,905 | 4/1970 | Thomas | 321/18 |
| 3,944,913 | 3/1976 | Kugler | 323/43.5 |
| 4,020,412 | 4/1977 | Rioux et al. | 323/43.5 |
| 4,748,341 | 5/1988 | Gupta | 307/64 |
| 5,001,623 | 3/1991 | Magid | 363/143 |
| 5,045,835 | 9/1991 | Masegi et al. | 340/438 |
| 5,057,697 | 10/1991 | Hammond et al. | 307/60 |
| 5,136,175 | 8/1992 | Lösel | 307/66 |
| 5,138,185 | 8/1992 | Weinstock | 307/66 |
| 5,168,436 | 12/1992 | Barlage | 363/21 |

Primary Examiner—William M. Shoop, Jr.
Assistant Examiner—Albert W. Paladini
Attorney, Agent, or Firm—Dilworth & Barrese

[57] ABSTRACT

An electric device is provided as an interface between a permanent power source and an electrical appliance for maintaining the appliance, or a component thereof, in an operative state during a momentary power failure. The electric circuit includes an auto-transformer for increasing the induced back electric magnetic field voltage which is present in the line voltage of the permanent power source during a momentary power outage. The auto-transformer increases the induced back electric magnetic field voltage to a voltage level which is sufficient to maintain digital clocks or other low power-requiring components incorporated in an electrical appliance in an operative state during a momentary power outage.

15 Claims, 4 Drawing Sheets

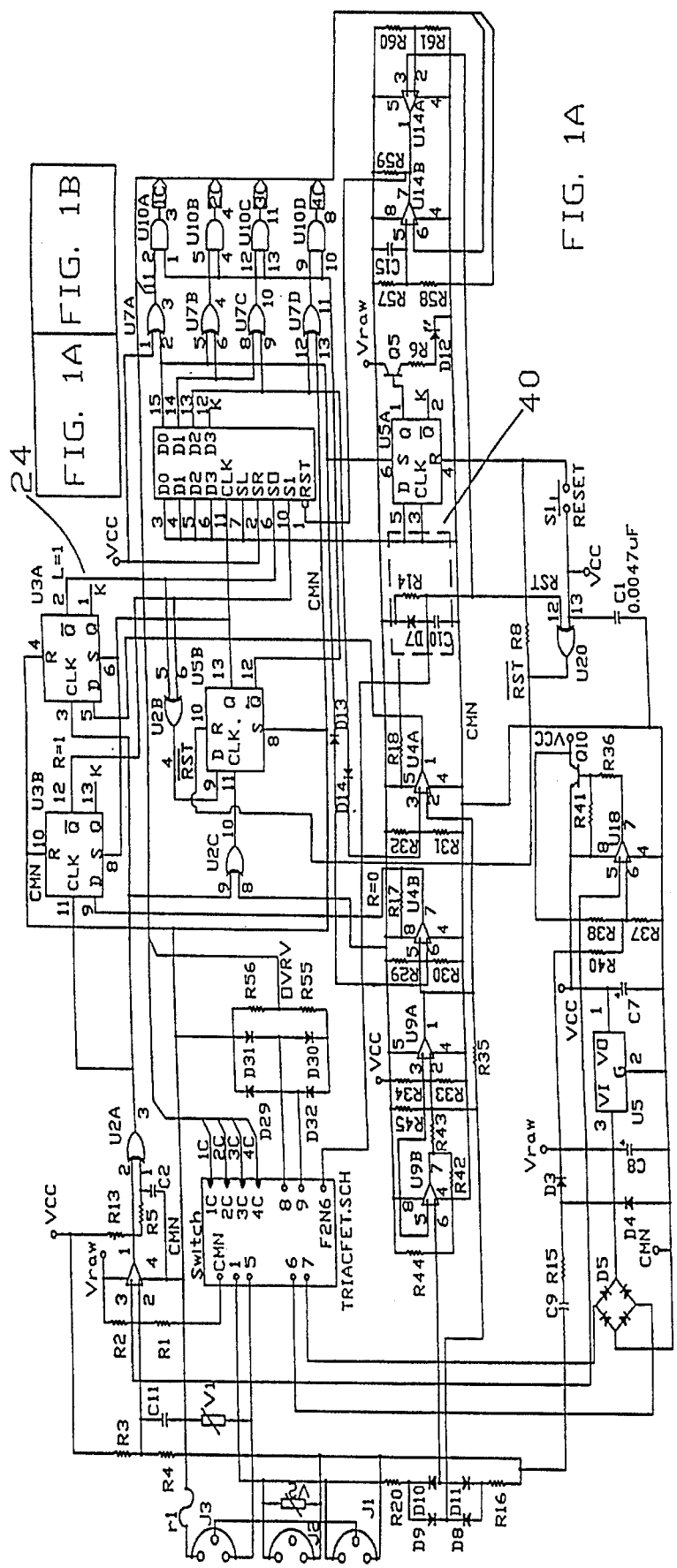

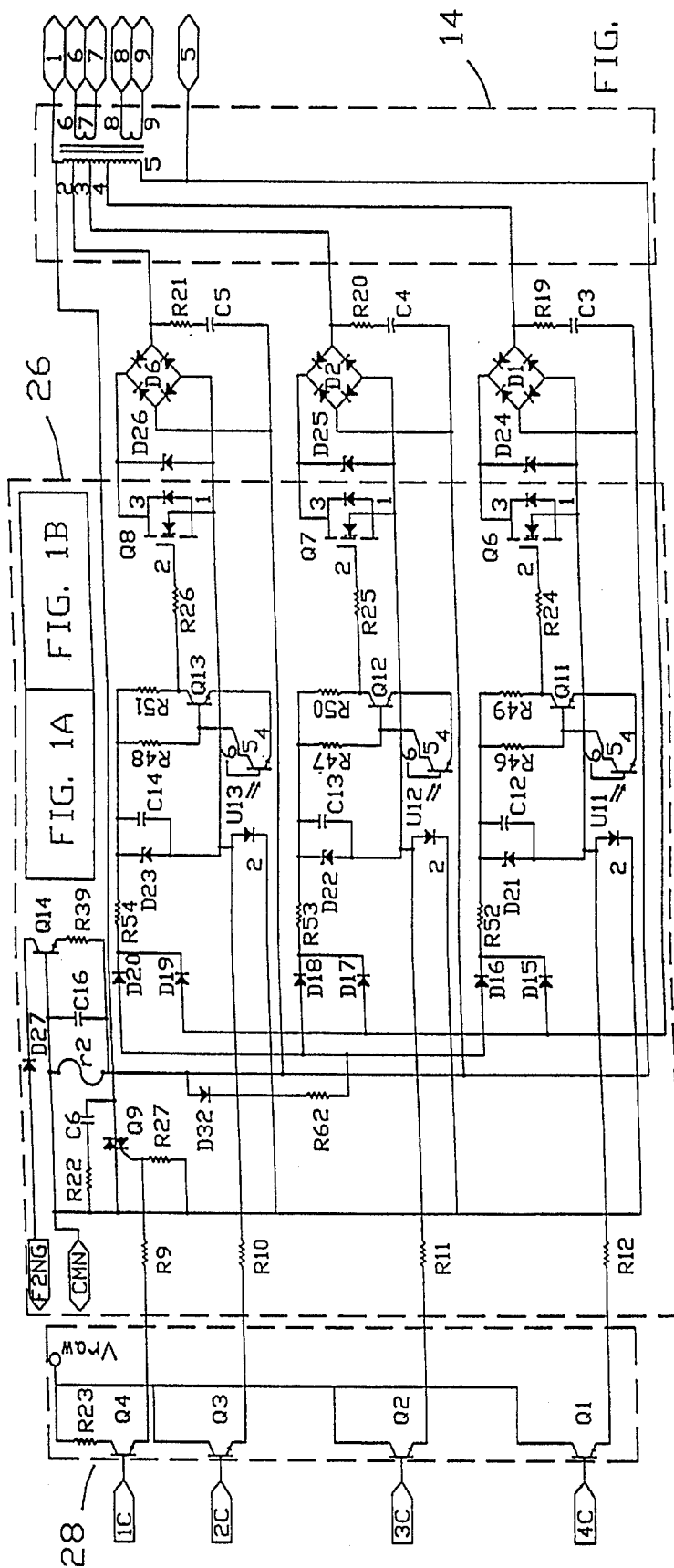

MOMENTARY POWER OUTAGE CARRYOVER DEVICE

BACKGROUND OF THE INVENTION

1. Field of the Invention

The subject invention relates generally to a device for enabling a low power requirement device to remain operative during a momentary power outage and more specifically to a device for increasing the induced back electrical magnetic field voltage associated with the line voltage connected to an electrical appliance as the line voltage drops off during a momentary power outage to momentarily compensate for the power failure.

2. Discussion of the Prior Art

Digital clocks have been incorporated into many of today's electronic devices. One particular area of electronic devices which digital clocks have been incorporated into is household appliances. Such household appliances include: alarm clocks, radios, televisions, VCR's, microwave ovens, coffee makers, and the like. These digital clocks are operated by direct current at typically very low voltages. However, the power which is supplied to the appliance is generally in the form of high voltage alternating current which must be stepped down to a lower voltage by a transformer and changed into direct current by suitable means such as a rectifier within the appliance to supply voltage to the digital clock.

Momentary power outages have proven to be troublesome for digital clocks. Unlike analog clocks which are driven by line power and which re-start when line power is restored after a momentary power outage, digital clocks do not restart after a momentary power outage. Generally, digital clocks, after a momentary power outage, are programmed to go into a pre-designed mode so as to indicate that a power interruption has occurred. For example, after a momentary power outage, a digital clock may be designed so as to continuously flash "12:00", until such a time as the user resets the digital clock.

Many of today's households have numerous digital clocks, and the failure and subsequent resetting of each individual digital clock after a momentary power outage is a tedious and burdensome task. Moreover, the failure of digital clocks after a momentary power outage may give rise to undesirable situations. For example, if an alarm clock utilizes a digital clock, a momentary power outage could cause the user to oversleep and not wake at the proper time. Further, the failure of a VCR digital clock after a momentary power outage may result in the failure of the VCR device to record preselected programs.

Momentary power outages can be attributed to numerous causes which generally include interruptions in the distribution of line power caused by acts of God, and or, acts of man. The vast majority of momentary power outages last for a duration of less than one second, however, such a duration is sufficient to give rise to the failure of digital clocks.

There have been many prior attempts to provide for backup power which is to be utilized in the event of a momentary power outage. See for example, U.S. Pat. No. 5,138,185 to Weinstock, No. 5,057,697 to Hammond et al., and No. 5,001,623 to Magid. Such devices essentially utilize battery means for supplementing electrical power to an electrical device in the event of a momentary power outage. However, the usage of batteries for supplying a source of backup power is disadvantageous in that batteries often need replacement or require carefully monitored charging. If a faulty battery is not replaced of if a battery is not charged to a threshold voltage level, this battery may be unable to provide an amount of electrical power sufficient to maintain a digital clock in an operating state in the event of a momentary power outage. Moreover, if the battery is to be incorporated directly into the appliance, the battery is further disadvantageous in that it requires a large storage space in the appliance.

Accordingly, it is an object of the present invention to provide an improved backup power device to keep low power requirement electrical devices in their operative state for at least a period of time greater than the temporal extent of an average momentary power outage.

Yet another object of the present invention is to provide a portable and inexpensive device which prevents digital clocks from resetting in the event of a momentary power outage.

Other objects, advantages and new features of the present invention will become more readily apparent from the following detailed description of the invention when considered in conjunction with the accompanying drawings.

SUMMARY OF THE INVENTION

The present invention relates generally to an electrical device which maintains uninterruptable electrical power to a household appliance during a momentary power outage. In particular, during a momentary power outage, the electrical device of the present invention increases the voltage which is present in the electrical magnetic field associated with an AC permanent power source to a sufficient voltage level so as to maintain digital clocks or other low power requirement auxiliary accessories of an appliance in an operative state during the momentary power outage.

During a momentary power failure, electrical energy is present in the form of an induced back electrical magnetic field voltage which is associated with the AC permanent power source to which household appliances connect. For example, during a brief power interruption, an induced back electrical magnetic field voltage is present in the windings of an electrical motor. In addition to the electrical energy stored in electric rotating machinery, there is electrical energy stored in the magnetic field around distribution cables, as well as in the core of distribution transformers. It is noted that the above mentioned rotating machinery, distribution cables and distribution transformers are all components which make up the AC permanent power source to which electrical appliances connect. Thus the invention utilizes the induced back electrical magnetic field voltage of an AC permanent power source during a momentary power outage so as to maintain digital clocks and other low power requirement auxiliary components which are connected to the AC power source in an operative state and prevent the subsequent need for resetting such a digital clock.

The electrical device of the present invention essentially comprises means for increasing the voltage which is present in the electrical magnetic fields associated with the permanent power source to which an electrical appliance is connected as the line voltage drops off during the outage. The voltage level is increased through the device to a level which is sufficient to maintain digital clocks or other low power requirement auxiliary components in an operative state during a momentary power outage. Also provided are switching means coupled to the means for increasing the electrical magnetic field voltage for switching the line voltage of the permanent power source to the means for increasing the electrical magnetic field voltage in the event the line voltage tails below a predetermined voltage level, such as during a momentary power outage.

The means for increasing the electrical magnetic field voltage preferably includes an auto-transformer having a primary winding and a secondary winding. The secondary winding is preferably coupled to the control circuit, while the primary winding is coupled to the line voltage of the permanent power source and to the load (the electrical appliance). The primary winding is preferably provided with a plurality of input taps for selectively stepping up the induced back electrical magnetic field voltage to a predetermined voltage level which is sufficient to supply the low voltage requirement of digital clocks and the like. Therefore, the plurality of input taps of the auto-transformer enable the auto-transformer to match the decaying line voltage so as to satisfy the power requirements of the low voltage accessories of the attached appliance. The load is permanently connected across the ends of the primary winding.

The switching means of the present invention includes a plurality of triacs coupled to the plurality of input taps of the auto-transformer for facilitating the temporary connection of the line voltage from the AC permanent power source to the auto-transformer. The switching means also includes a control circuit coupled to the line voltage of the AC permanent power source, and to the plurality of triacs. The control circuit constantly monitors the load voltage and when the load voltage falls below a staple reference voltage, the control circuit selects the proper triac so as to increase the line voltage, via the auto-transformer, to a sufficient voltage level so as to maintain operation of the digital clock or similar low power requirement accessories. Preferably, the control circuit is configured as a microprocessor which is powered by the line voltage of the AC permanent power source.

In a preferred embodiment, the electric circuit of the present invention is enclosed in a portable housing formed of a non-conductive material such as plastic. A pair of current contacts, typically in blade form as in a power plug member, extend from the housing and are configured to connect to the AC permanent source of power, such as conventional electric receptacles. Further, a pair of outlet slots are provided in the housing and are configured for the reception of electric plug assemblies for connecting electrical appliances to the device of the present invention.

BRIEF DESCRIPTION OF THE DRAWINGS

Further features of the electrical device of the present invention will become more readily apparent from the following detailed description of the invention taken in conjunction with the accompanying drawings, in which:

FIG. 1A is a schematic illustration of a control circuit of the present invention;

FIG. 1B is a schematic illustration of drivers, a triac network and an auto-transformer of the present invention.

DETAILED DESCRIPTION OF THE PREFERRED EMBODIMENT

Figure 1:
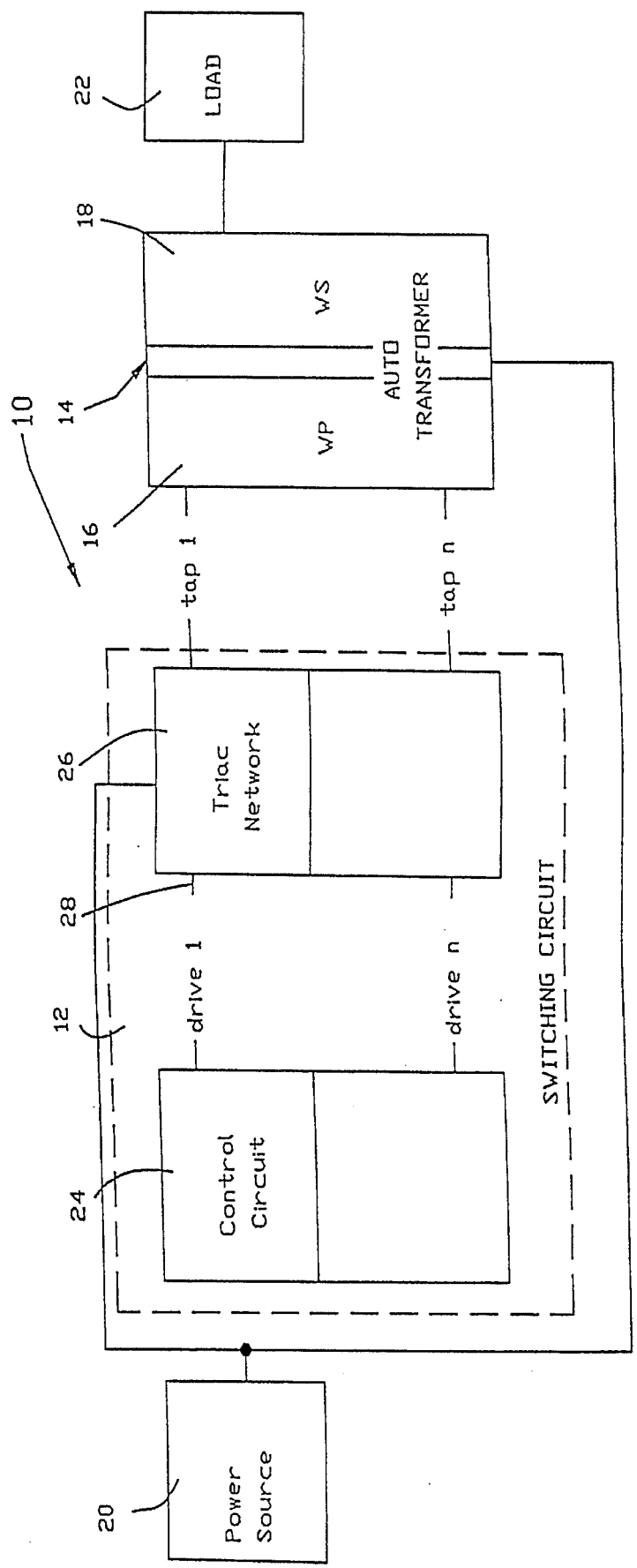
FIG. 1 is a diagrammatic illustration of the present invention.

Turning now to the drawings, in which like reference numerals identify similar or identical elements, FIG. 1 schematically illustrates an electronic device for increasing the voltage from an alternating current (AC) power source to an appliance as the line voltage drops off during a momentary power outage, the electronic device being designated generally by reference numeral 10. Essentially, the electronic device 10 includes a switching circuit 12 coupled to an auto-transformer 14 having a primary winding 16 and a secondary winding 18. The switching circuit 12 is coupled to an AC power source 20 while the auto-transformer 14 is coupled to a load 22. The load 22 is preferably a household appliance which includes a digital clock or another low power requirement auxiliary accessory that operates on low voltage direct current. It is noted that the load 22 includes its own step down transformer and rectifier means so as to deliver low power direct current to a digital clock or a similar auxiliary accessory during normal intended use of the appliance. Additionally, it is to be appreciated that the load 22 may comprise equipment typically found in office environments, such as, personal computers, copying machines and the like.

The switching circuit 12, during a momentary power outage, is configured and designed to switch the line voltage of an AC power source to an appropriate input tap of the auto-transformer 14, as will be described in more detail below. Thereafter, the voltage which is present in the electrical magnetic fields associated with the line voltage of the AC power source is increased as the line voltage drops off to a voltage which is sufficient so as to maintain a digital clock or similar low power requirement auxiliary accessory associated with the load 22 in an operative state during a momentary power outage. Essentially, the switching circuit 12 comprises a control circuit 24 and a triac network 26.

The control circuit 24 couples to the AC power source 20 and is configured to constantly monitor the voltage at the load 22 for detecting if a momentary power outage has occurred. Further, if a momentary power outage has occurred, the control circuit measures the voltage which is present in the induced back electrical magnetic fields associated with the AC power source (usually present for a duration of up to one second), the significance of which will be described in detail below. In particular, the control circuit 24 utilizes a stable voltage reference to which the line voltage of the AC power source 20 is compared. The control circuit 24 may be configured as a microprocessor which is powered by the line voltage. During a momentary power failure, the control circuit microprocessor is configured so as to be powered by the induced back electrical magnetic field voltage in the line voltage of the AC power source 20. Control circuit 24 maintains voltage at the load 22 by utilizing decaying voltage present in the input line from power source 20, during a momentary outage. Input line voltage is matched to tapped auto-transformer 14 to maintain the voltage to the load at or around 80 volts.

An example of an embodiment of the electronic device is illustrated in FIG. 1. FIGS. 1A and 1B illustrate schematic diagrams of specific components of the device 10 of FIG. 1. The operation and the wiring of control circuit 24 (FIG. 1A) and its ability to receive and utilize power received from power source 20 (FIG. 1) is as follows.

With reference to FIG. 1A, when control circuit 24, as seen in FIG. 1, receives power by the induced back electrical magnetic field voltage, capacitor C9 (used as a loss less series element to power up control circuit 24), in conjunction with diodes D3 and D4, forms a half wave power rectifier, which charges capacitor C8. When the voltage across capacitor C8 reaches nominally 8 Volts, series regulator U8 begins to operate linearly, and provides a regulated 5 Volt source, labeled Vraw in the schematic, to comparators U1A, U1B, and to resistors R1 and R2. The voltage reference (2.5 Volts) provided by resistors R1 and R2 as a voltage divider is applied to comparator U1B pin 5, the comparator's positive input. The negative input to comparator U1B is driven by voltage divider R40, R37 and R38, which is designed to provide about 1.88 Volts at comparator U1B pin 6 when Vraw is 8 Volts. Comparator U1B output is therefor in a high state, keeping PNP transistor Q10 in the low or 'OFF' state. As the collector of PNP transistor Q10 drives Vcc, the power to all other ICs, while PNP transistor Q10 is in the low or 'OFF' state, are powered 'OFF' Capacitor C9 continues to charge capacitor C8, raising the value of Vraw. When Vraw reaches approximately 10.6 Volts, comparator U1B activates, turning its output low or 'OFF', turning 'ON' PNP transistor Q10, which turns 'ON' Vcc. As detailed below, after power-up reset, an auxiliary winding on the auto-transformer (pins 6 and 7 on 14 in FIG. 1B) then provides power to the control circuit 24 through diode bridge D8 through D11.

On power up, by using back electrical magnetic field voltage (defined at the time when PNP transistor Q10 turns on, and Vcc becomes 5 Volts), power-on-reset circuit 40 as shown in FIG. 1A, composed of diode D7, resistor R14 and capacitor C10, which is enclosed in control circuit 24, resets up/down shift register U6 pin 1 through op-amp U14A pin 1, and resets flip-flop (FF) U5B through U2D pin 11. Therefore, at start up, shift register U6 is reset, forcing shift register U6 pins 12, 13, 14 and 15 to a logic low; in addition, since U5B is reset, U5B pin 12 is forced to a logic high. Inputs to 'Exclusive-or' (XOR) gate U7A are: logic high at pin 1 and logic low at pin 2, forcing 'XOR' gate U7A pin 3 to a logic high. 'AND' gate U10A inputs (pins 1 and 2) are both at that time at logic high, completing the 'AND' gate, and forcing 'AND' gate U10A output (pin 3) to a logic high level.

Pin 3 of 'AND' gate U10A turns on emitter follower Q4 in FIG. 1B, turning on triac Q9 of triac network 26. Triac Q9 connects the input power line to pin 1 of transformer 14, completing the circuit for the auto-transformer 14 at the highest tap. It should be noted that pin 5 of auto-transformer 14 is permanently connected to the low side of the input power line. After the circuit is completed, auto-transformer 14 is energized, providing an isolated low voltage output at auto-transformer 14 pins 6 and 7 and to pins 8 and 9. For example, the voltage produced at auto-transformer 14 pins 6 and 7 is applied to diode bridge D6, which is coupled to pin 2 of auto-transformer 14, which in turn provides power for the entire control circuit 24. Thus, the low current produced by capacitor C9 of FIG. 1A is augmented by auto-transformer 14 pins 6 and 7 of FIG. 1B. The control circuit 24 now begins its normal operation, and enables the use of back electrical magnetic field voltage. It may be appreciated that the design of the preferred embodiment is line voltage dependent. The electronic device 10 in FIGS. 1, 1A and 1B will sustain the load 22 to maintain the operation of digital clocks or other low power requirement auxiliary accessories of at least one appliance when the back electrical magnetic field voltage of AC power source 20 (FIG. 1) is at a minimum of 20 V. The maintenance of the digital clock operation (or other low power auxiliary accessories) may substantially exceed one second outage period as long as at least minimum voltage is maintained.

As illustrated in FIG. 1, the triac network 26 includes a plurality of triacs for connecting the line voltage of the AC power source 20 and to the auto-transformer 14. An example of the possible connections between auto-transformer 14 and triac Q9, and between auto-transformer 14 and FETs Q11, Q12 and Q13 is illustrated in FIG. 1B. The power winding for auto-transformer 14 consists of pin 5, which is the common terminal, and which is permanently connected to the low side of the input AC power line, pin 1 which is the high tap, and pins 2, 3 and 4 which are the intermediate taps. Only one pin among pins 1, 2, 3 and 4 for auto-transformer 14, is selected and energized at any one time. A triac Q9 is used to connect auto-transformer 14 pin 1 to the input high line, and FET (Q13, Q12 and Q11) are used to connected the high line input to auto-transformer 14 pins 2, 3 and 4, respectively. Specifically, each triac couples to both the AC power source 20 to the auto-transformer 14. Further, each triac is coupled to the control circuit 24 by a dedicated drive line 28. Connections between the triac network 26 and control circuit 24 are illustrated in FIGS. 1A and 1B. Triac Q9 (FIG. 1B) which connects the high line input to auto-transformer 14 pin 1 (FIG. 1B) is driven from 'AND' gate U10A pin 3 (FIG. 1A) through driver Q4 (FIG. 1B). FET Q13 (FIG. 1B) is driven from 'AND' gate U10B pin 6 (FIG. 1A) through driver Q3 (FIG. 1B) and optoisolator U13. FET Q12 is driven from 'AND' gate U10D pin 11 (FIG. 1A) through driver Q2 (FIG. 1B) and optoisolator U12. FET Q11 is driven from 'AND' gate U10C pin 8 (FIG. 1A) through driver Q1 (FIG. 1B) and optoisolator U11. Depending upon the induced back electrical magnetic field voltage present at the load 22 during a momentary power outage, the control circuit 24 selects which triac, via a drive line 28, is to couple the line voltage of the AC power source 20 to the auto-transformer 14 so as to provide a voltage which is sufficient to maintain a digital clock or another low power requirement auxiliary accessory associated with the load 22 in an operative state during the momentary power outage. Specifically, the significance of each triac contained in the triac network 26 is that each triac is coupled, via an input tap, to a different winding portion of the primary winding 16 of the auto-transformer 14. Thereby, each triac is enabled to couple the line voltage to the auto-transformer 14 through a different winding ratio between the selected tap and the entire primary winding 16 as compared to the next proceeding or succeeding triac. It is well known that the winding ratio between a selected winding tap and the entire winding determines the difference in the voltage which is inputted into the tap winding and which is provided from the entire winding. Thus, the proper winding ratio between the tap and entire primary winding 16 of the auto-transformer 14, will enable the induced back electrical magnetic field voltage to be increased to a sufficient voltage so as to maintain a low power requirement accessory of an appliance operative during a momentary power outage.

As mentioned above, the auto-transformer 14 is provided with a primary winding 16 and a secondary winding 18. The secondary winding 18 is a low voltage winding which provides stable power to the control circuit 24. The primary winding 16 is provided with a plurality of input taps, whereby each input tap is connected to a single triac in the triac network 26. The individual input taps connected to the primary winding 16 are selected by the control circuit 24, via the triac network 26, so as to enable the auto-transformer 14 to increase the decaying voltage of the AC power source 20 to a voltage which is sufficient to maintain a low power accessory in an operative state during a momentary power outage of the AC power source 20. Thus, during a momentary power outage of the AC power supply 20, the control circuit 24 determines the load 22 voltage as a result of the decaying line voltage which is present in the electrical magnetic fields associated with the AC power supply and transfers this decaying line voltage, via an input tap, to the primary winding 16 of the auto-transformer 14, such that the voltage provided from the secondary winding to the load 22 is sufficient to keep a digital clock or the like operative. Preferably, the voltage from the secondary winding 18 to the load 22 is between 90 and 120 v during a momentary power outage.

Thus, the control circuit 24 is operative to, first, receive the line voltage from the AC power source 20 and to compare the load 22 voltage to the stable voltage reference of the control circuit 24. If the load voltage is greater than the stable voltage reference, (meaning no momentary power outage has occurred) the control circuit 24 then selects the appropriate triac which is connected to an input tap 16 of the primary winding 16 of the auto-transformer 14 so as to enable the line voltage to be relayed through the auto-transformer with neither an increase nor decrease in the voltage level of the line voltage from the AC power source. Therefore, the auto-transformer 14, in this instance, is operative to effectively only provide a measure of isolation between the electronic device 10 and the load 22, via the secondary winding 18 of the auto-transformer 14.

However, when the line voltage at the load is less than the stable voltage reference of the control circuit 24 (meaning a momentary power outage has occurred), the control circuit 24 then measures the voltage which is present in the line voltage from the induced backed electrical magnetic field associated with the AC Power source 20. The control circuit 24 then selects the appropriate triac in the triac network 26 so as to increase this induced back electrical magnetic field voltage, via the auto-transformer 14, to a voltage which is sufficient to maintain a digital clock or another low power requirement accessory in an operative state during the momentary power outage. Specifically, the triac chosen by the control circuit 24 to couple the line voltage to the auto-transformer 14, couples the line voltage, via an input tap, to the primary winding 16 of the auto-transformer 14 through a proper winding ratio in the auto-transformer, so as to increase the induced backed electrical magnetic field voltage present in the line voltage of the AC power source to a voltage which is sufficient to maintain a digital clock or the like which is coupled to the secondary winding 18 of the auto-transformer 14, in an operative state during the momentary power outage.

An example of triac selection process by control circuit 24 is illustrated in FIGS. 1A and 1B. Referring to FIGS. 1A and 1B in detail, resistors R16 and R28 with diodes D8, D9, D10 and D11 in conjunction with operational amplifiers U9A and U9B, provide a full wave rectified voltage at operational amplifier U9A pin 8 which is a scaled representation of the voltage at auto-transformer 14 (FIGS. 1 and 1B) output, the voltage between auto-transformer 14 pin 1 and pin 5. The full wave rectified signal from operational amplifier U9A (FIG. 1A) pin 1 is applied to comparators U4B pin 5 and U4A pin 2.

Resistor divider formed by resistor R29 and resistor R30 is selected such that the crest of the full wave rectified signal at operational amplifier (op-amp) U9A pin 1, when at least 80 VRMS is present at auto-transformer 14 (FIG. 1B) between pin 1 and pin 2, will just cause comparator U4B pin 7 to fire to a high logic level. Resistor divider formed by resistors R31 and R32 is selected such that the crest of the full wave rectified signal at operational amplifier (op-amp) U9A pin 1, when at least 120 VRMS is present at auto-transformer 14 between pin 1 and pin 2, will just cause comparator U4A pin 1 to switch to a low logic level. Using the logic as shown above, the following truth table is generated, relating the voltage level at auto-transformer 14 pin 1 to pin 5, and comparators U4B pin 7 and U4A pin 1 outputs:

TABLE 1

| Case | Voltage at auto-transformer 14 pin 1 to pin 5 | Comparator U4B pin 7 output | Comparator U4A pin 1 output |
| --- | --- | --- | --- |
| A | less than 80 VRMS | low | high |
| B | greater than 80 VRMS, and less than 120 VRMS | high | high |
| C | greater than 120 VRMS | high | low |

Output status of comparator U4B pin 7 and comparator U4A pin 1 are stored in flip flops (FF) U3B and U3A, respectively. The trigger input to FFs U3B and U3A which causes data input transfer and storage occurs at the positive and negative crests of the input powerline. The trigger which is time coincident with the positive and negative input voltage crests is generated as follows: capacitor C11 is connected to the input voltage, and together with resistor divider R3 and R4 forming an integrated circuit, therefore causing a 90 degree phase shift of the input power line voltage at the input of comparator U1A pin 2. The signal at comparator U1A pin 1 is therefore a square wave, which is 90 degrees out of phase with the input power voltage. 'XOR' gate U2A, with delay circuit formed by resistor R5 and capacitor C2, produces a narrow positive going pulse at 'XOR' gate U2A pin 3 at every transition of the wave form at comparator U1A pin 1. The leading edge of the pulses at 'XOR' gate U2A pin 3 are the triggers which clock flip flops U3B and U3A. The signal at 'XOR' gate U2A pin 3 is inverted by 'XOR' gate U2C, and applied to flip flop (FF) U5B. The logic is such that the leading edge of the narrow pulses at 'XOR' gate U2A pin 3 triggers FF U3B and FF U3A, while the trailing edge, after being inverted by 'XOR' gate U2C, triggers FF U5B. Therefore, after the trailing edge of the 'XOR' gate U2A pin 3 pulse, the comparators U4B pin 7 and U4A pin 1 logic levels are transferred with a logic inversion to FF U3B pin 12 and FF U3A pin 2, respectively.

'Exclusive-or' (XOR) gate U2B pin 5 receives the signal from FF U3A pin 2 and XOR gate U2B pin 6 receives signal from U3B pin 12). From the truth table (TABLE 1) herein, and accounting for the logic inversion by FFs U3A and U3B, it is apparent that as long as the auto-transformer 14 output is between 80 VRMS and 120 VRMS, both inputs to 'XOR' gate U2B will be low, forcing FF U5B pin 13 low. As long as auto-transformer 14 (FIG. 1B) output voltage remains between 80 VRMS and 120 VRMS, FF U5B pin 13 will remain in the low state. Shift register U6 will remain in its quiescent state, so that 'XOR' gates U7A, U7B, U7C and U7D, and 'AND' gates, U10A, U10B, U10C and U10D will also remain in their quiescent states. The state of the drivers (Q1, Q2, Q3 and Q4) to the triac Q9 and FETs Q11, Q12 and Q13 will therefore remain in their quiescent states, causing no change to occur at the auto-transformer 14 (FIG. 1B) output.

For the following discussion, assume that after power up, the input line voltage remains between 80 VRMS and 120 VRMS, such that the following logic states result: shift register U6 pin 12, pin 13, pin 14 and pin 15, 'XOR° gates U7B pin 4, U7C pin 10 and U7D pin 11 and 'AND' gates U10B pin 6, U10D pin 11 and U10C pin 8 are all logic level low. 'XOR' gate U7A pin 3 and 'AND' gate U10A pin 3 are both logical level high. Plurality of drivers 28 can include, for example, drivers Q1, Q2, Q3 and Q4. When driver Q4 is 'ON', it turns 'ON' triac Q9. If the line voltage drops below 80 VRMS, comparator U4B (FIG. 1A) will not activate, causing FF U3B pin 12 to switch to a low logic level after the leading edge of the trigger generated by 'XOR' gate U2A pin 3. The inputs to 'XOR' gate U2B are now pin 5 high, and pin 6 low. The output of 'XOR' gate U2B pin 4 now goes to a logic level high, such that when the inverted trailing edge of 'XOR' gate U2A pin 3 triggers, as it appears at, 'XOR' gate U2C pin 9, causing the output of FF U5B pin 13 to go to a logic level high, and FF U5B pin 12 to go to a logic level low ('OFF'). The transition to a high logic level at FF U5B pin 13 causes FFs U3A and U3B to be set ('ON'), forcing both FF U3A pin 2 and FF U3B pin 12 to a high logic level, its quiescent state. 'XOR' gate U2B pin 4 output then returns to a low logic level ('OFF').

The low logic level at FF U5B pin 12 causes the active output of 'AND' Gates U10A, U10B, U10C and U10D to go low ('OFF'), turning off any triac, FET or driver.

When the FF U5B pin 13 logic level goes high, shift register U6 is triggered. As configured, shift register U6 pin 9 will be low, and shift register U6 pin 10 will be high, causing the shift register U6 to shift in a logic high ('ON') into its first position, so that shift register U6 pin 15 goes high. This causes 'XOR' gate U7A pin 3 to go low, and 'XOR' gate U7B pin 4 to go high.

The next 'XOR' gate U2A pin 3 trigger will be ignored by FF U3A and FF U3B, since their 'set' input pins are held high by FF U5B pin 13. The inverted trailing edge trigger at 'XOR' gate U2C pin 10, returns FF U5B pin 13 to a low logic level ('OFF'), and FF U5B pin 12 to a high logic level ('ON'). The high logic level at FF U5B pin 12 enables 'AND' gates U10A, U10B, U10C and U10D, so that the logic high now at 'XOR' gate U7B pin 4, is passed through to 'AND' gate U10B pin 6, turning on driver Q3 (FIG. 1B) of the plurality of drivers 28 and optoisolator U13, which turns on FET Q13, which connects the input high line to auto-transformer 14 pin 2. This new connection causes a step up in the output voltage at auto-transformer 14 pin 1 to pin 5. Note that since the logic circuitry is deriving its input power from auto-transformer 14 pin 6 and pin 7, the input power to regulator U8 (FIG. 1A) would now be restored to normal level.

If the output voltage at auto-transformer 14 pin 1 to pin 5, again drops below 80 VRMS, the process repeats, turning off FET Q8, and turning on FET Q7, which is connected to auto-transformer 14 pin 3. If the out voltage, auto-transformers 14 pin 1 to pin 5, against drops below 80 VRMS, the process again repeats, turning off FET Q7, and turning on FET Q6, which is connected to auto-transformer 14 pin 4. At this point, shift register U6 pin 13 through diode D14, inhibits further selection of a lower tap. Therefore, if the voltage drops below 80 VRMS, control circuit 24 will continue to select FET Q6, until the power to control circuit 24 drops below its operating point, which occurs at a line input voltage of 20 VRMS to 25 VRMS.

When auto-transformer 14 pin 2 is selected, and the output voltage at auto-transformers 14 pin 1 to pin 2 increases to above 120 volts, a similar process occurs to the process described above. In that case, comparator U4A pin 1 is sampled below, FF U3A pin 2 goes high, shift register U6 is shifted low such that shift register U6 pin 15 goes low, driver Q3 is de-energized, and driver Q4 is energized.

The following is a truth table for the connection selected by the control circuit 24, dependent on input line voltage:

TABLE 2

| Input range | Driver | Switch/ Triac/FET | Selected tap |
| --- | --- | --- | --- |
| 80 to 120 VRMS | Q4 | Q9 | auto-transformer 14 pin 1 |
| 53 to 80 VRMS | Q3 | Q13 | auto-transformer 14 pin 2 |
| 36 to 53 VRMS | Q2 | Q12 | auto-transformer 14 pin 3 |
| 23 to 36 VRMS | Q1 | Q11 | auto-transformer 14 pin 4. |

Referring to FIGS. 1, 1A and 1B, it is noted that the control circuit 24 is constantly monitoring the load voltage and accordingly will consistently choose the proper triac in the triac network 26, during a momentary power outage so as to increase the voltage level of the induced back electrical magnetic field voltage to a sufficient voltage for the load 22 as fully described above. For instance, during the time period of the momentary power outage of the AC power source 20, the induced back electrical magnetic field voltage in the line voltage will decrease according to a time constant, and the control circuit during this time period accordingly selects the proper triac in the triac network so as to match the decaying line voltage to the proper input tap of the primary winding 16 of the auto-transformer 14 so as to provide a voltage from the entire primary winding 16 which is sufficient for the requirements of the load 22 as fully described above. Further, if a period of time such as two seconds, has elapsed during a momentary power outage, the induced back electrical magnetic field voltage may decrease to a substantially low voltage level, such as 1 v, accordingly, the control circuit 24 will not couple the line voltage to a triac in the triac network 26, but will rather shut down the electric device 10, inevitably causing all the accessories of the load 22 to go into an inoperative state. The control circuit will continually monitor the line voltage until such a time until the power outage has ceased, (i.e., the line voltage is greater than the stable voltage reference) whereafter the electric device will become operative and full electric power will be supplied to the load 22.

It is noted that full line power is not delivered to the appliance by device 10 during a momentary power outage. AC power at a lower level, sufficient only to maintain operation of auxiliary devices in the appliance, such as digital clocks, is delivered to the appliance during the outage. This is because even though the voltage being furnished by the auto-transformer 14 will preferably be between 90 and 120 v, the electrical power of the line voltage during a momentary power failure will not be of the same magnitude as compared to the electrical power of the line voltage when the AC power source is not experiencing a momentary power outage. During a momentary power failure, when the voltage is increased in the auto-transformer 14, the current in the line voltage is consequently sacrificed to provide for the increase in voltage between the selected primary tap and the entire primary winding 16 of the auto-transformer 14. It is thus readily apparent that since current (I) is an equal component to voltage (v) in the determination of electrical Power (P), (P=VI), a sacrifice in the current level will amount to a lessening in the amount of electrical power being furnished to the load 22, by the transformer 14.

Therefore, the digital clock or the low power requirement of the accessory of the appliance is maintained in its quiescent state only. If the appliance is a VCR that is running (i.e., the motor is running in the VCR), when the line current is interrupted from the AC power supply 20, insufficient power will be supplied thereto by device 10 and the VCR may be inoperative and any digital clocks incorporated in the VCR will require re-setting. However, if a VCR were in its quiescent state at the time of the momentary power outage, then the device 10 will increase the voltage present in the electrical magnetic fields associated with the AC power supply to a sufficient voltage so as to maintain the VCR or other clock containing device in its quiescent state, i.e., it will supply sufficient power to maintain the digital timers and controls in their operating state until such a time as the power is restored or after a few seconds whereafter the voltage present in the electrical magnetic field will have dissipated to a voltage insufficient for the device 10 to utilize.

Figure 2:
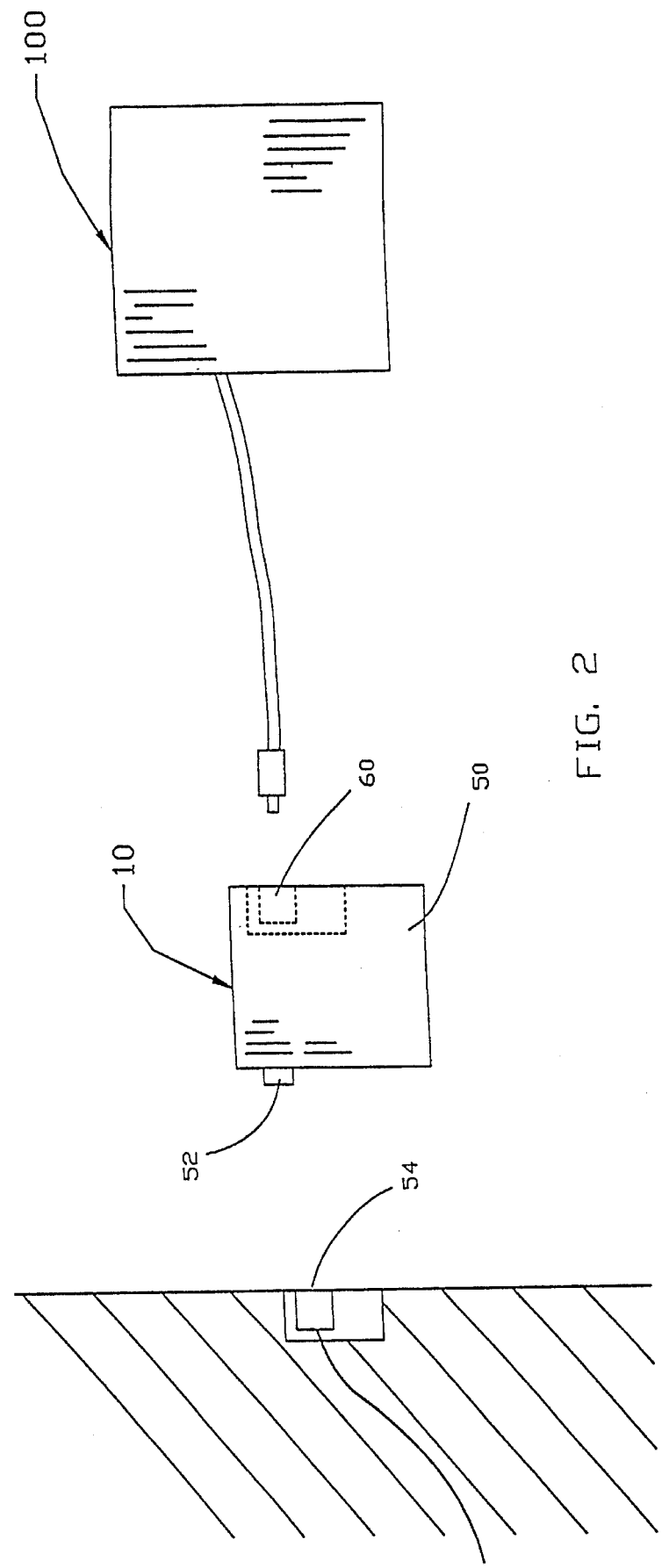
FIG. 2 is a diagrammatic representation of the circuit of the present invention enclosed in a housing and being shown in an intended environment of use.

Turning now to FIG. 2, in a preferred embodiment, the electrical device 10 of the present invention is enclosed in a housing 50 formed of a non-conductive material, such as plastic. A pair of current contacts 52 such as power plug blades are coupled to the control circuit 24 (FIG. 1) and extend outward from the housing 50. The pair of current contacts 52 engage a wall socket 54 or any other permanent source of AC power. Further, a pair of current outlet slots 60 are coupled to the entire primary winding 16 of the auto-transformer 14 (FIG. 1) and are configured to accept an electrical plug from an appliance 100.

While the invention has been particularly shown and described with reference to the preferred embodiments, it will be understood by those skilled in the art that various modifications in form and detail may be made therein without departing from the scope and spirit of the invention. It is to be appreciated for instance, that the electric device 10 of the present invention may be incorporated directly into the power circuitry of an electrical appliance. Accordingly, modifications such as those suggested above, but not limited thereto, are to be considered within the scope of the invention.

What is claimed is:

1. A circuit for maintaining low voltage components in a load operational during a momentary power outage, which comprises:

(a) an input port for receiving AC power from an AC power source;

(b) an output port for delivering said AC power to said load;

(c) means for increasing the voltage of said AC power source, said means for increasing the voltage utilizing electrical magnetic fields present in said AC power source to increase said voltage as line voltage decreases during said power outage in said AC power device; and (d) switching means coupled to said increasing means for switching said AC power source to said increasing means when the line voltage of said AC power source is less than a predetermined voltage.

2. A device as recited in claim 1, wherein low voltage components of said load comprise digital timers, said means for increasing the voltage of an AC power source being operative to increase said voltage present in the electrical magnetic fields associated with said AC power source so as to maintain said digital timers in an operative state during a momentary power outage.

3. A device as recited in claim 1, wherein said means for increasing the voltage of an AC power source consists of an auto-transformer having primary and secondary windings.

4. A device as recited in claim 3, wherein said auto-transformer is provided with a plurality of input-taps coupled to said primary winding for enabling the line voltage of the AC power source to be coupled to said auto-transformer through a plurality of winding ratios between said primary and secondary windings.

5. A device as recited in claim 4, wherein said switching means includes a high speed voltage control circuit for monitoring the load voltage and switching said AC power source to one of said plurality of input taps for maintaining said load voltage between 90 and 120 v during a momentary power outage.

6. A device as recited in claim 5, wherein said high speed voltage control circuit includes a plurality of triacs for switching said AC power source to one of said plurality of input taps for increasing the voltage of an AC power source during a momentary power outage.

7. A device as recited in claim 3, wherein the predetermined voltage is configured to be between 90 and 120 v.

8. A device for maintaining low voltage components of an appliance operational during a momentary power outage; said device comprising:

an input port for receiving AC power from an AC power source;

an auto-transformer having a plurality of input taps for increasing the voltage present in the electrical magnetic field associated with the line voltage of the AC power source connected to said appliance;

a plurality of triacs coupled to said plurality of input taps of said auto-transformer for coupling said line voltage to said auto-transformer;

a control circuit coupled to said line voltage and to said plurality of triacs for monitoring the load voltage and coupling said line voltage to one of said plurality of input taps of said auto-transformer when said line voltage falls below a predetermined voltage level; and an output port for delivering said AC power to said appliance.

9. A device as recited in claim 8, wherein said auto-transformer is operative to provide between 90 to 120 v to said appliance during a momentary power outage.

10. A device as recited in claim 8, wherein said auto-transformer consists of a primary winding and a secondary winding, said primary winding being provided with said plurality of input taps and said secondary winding being coupled to said electrical appliance.

11. A device for providing ample electrical power to an electrical appliance so as to maintain said appliance's digital timers operative during a momentary power outage, comprising:

(a) a pair of current contacts configured to connect to a permanent source of power;

(b) a pair of current slots configured to connect to said electrical appliances;

(c) an auto-transformer coupled to said pair of current slots, said auto-transformer being operative to step up the voltage present in the electrical magnetic fields associated with the line voltage of the permanent power source so as to maintain operation of said appliance's digital timers during a momentary power outage of said permanent source of power; and (d) a switching circuit coupled to said pair of current contacts and to said auto-transformer for coupling said permanent source of power to said auto-transformer when said permanent source of power has a voltage level below a predetermined value.

12. A device as recited in claim 11, further comprising a housing for enclosing said auto-transformer and said switching circuit, said contacts extending from said housing and said slots extending into said housing.

13. A device as recited in claim 11, wherein said auto-transformer is provided with a plurality of input taps.

14. A device as recited in claim 13, wherein said switching circuit comprises:

(i) a plurality of triacs coupled to said plurality of input taps of said auto-transformer for coupling said permanent source of power to said auto-transformer; and (ii) a control circuit coupled to said pair of current contacts and said plurality of triacs for monitoring the permanent source of power and coupling the permanent source of power to one of said plurality of input taps of said auto-transformer when said permanent source of power has a voltage level less than a predetermined voltage.

15. An electrical device as recited in claim 12, wherein said predetermined value is between 90 and 120 v.

* * * * *